US010626038B1

(12) United States Patent
King et al.

(10) Patent No.: US 10,626,038 B1
(45) Date of Patent: Apr. 21, 2020

(54) MULTI-STAGE GLASS PRESSING SYSTEMS AND METHODS

(71) Applicant: Pittsburgh Glass Works, LLC, Pittsburgh, PA (US)

(72) Inventors: David V. King, Gibsonia, PA (US); David T. Perry, Poseyville, IN (US); Kurt Steinbacher, Evansville, IN (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 267 days.

(21) Appl. No.: 15/160,484

(22) Filed: May 20, 2016

Related U.S. Application Data (60) Division of application No. 14/455,294, filed on Aug. 8, 2014, now Pat. No. 9,346,701, which is a continuation-in-part of application No. 13/117,245, filed on May 27, 2011, now abandoned.

(51) Int. Cl.
  *C03B 23/035* (2006.01)
  *C03B 25/00* (2006.01)

(52) U.S. Cl.
  CPC .......... *C03B 23/0357* (2013.01); *C03B 25/00* (2013.01); *C03B 2215/50* (2013.01)

(58) Field of Classification Search
  CPC ............ C03B 23/0305; C03B 23/0357; C03B 2215/50; B29C 43/00; B25J 15/0683
  USPC ..................... 65/106–107, 287; 425/233, 346
  See application file for complete search history.

(56) References Cited

U.S. PATENT DOCUMENTS

| | | | |
|---|---|---|---|
| 3,582,304 A | 6/1971 | Bognar | |
| 4,265,652 A | 5/1981 | Goto et al. | |
| 5,122,177 A | 6/1992 | Yoshizawa et al. | |
| 5,599,367 A | 2/1997 | Funk et al. | |
| 7,108,471 B2 * | 9/2006 | Osuga | H01L 21/6835 294/188 |
| 7,240,519 B2 | 7/2007 | Schwartz et al. | |
| 8,413,467 B2 | 4/2013 | Guillame | |
| 2005/0061034 A1 * | 3/2005 | Boisselle | C03B 23/03 65/169 |

FOREIGN PATENT DOCUMENTS

| | | |
|---|---|---|
| EP | 0431895 | 6/1991 |
| EP | 1826186 | 8/2007 |
| JP | 2005170766 | 6/2005 |

* cited by examiner

*Primary Examiner* — Erin Snelting
(74) *Attorney, Agent, or Firm* — Dentons Cohen & Grigsby, P.C.

(57) ABSTRACT

Apparatus for shaping at least one glass sheet wherein a lower press ring and an upper press ring are configured to clamp a perimeter section of the glass sheet between the lower press ring and the upper press ring. The apparatus also includes an upper press at least partially disposed within the upper press ring and configured to shape at least a section of the glass sheet inside the perimeter section of the glass sheet, including forming by use of applied vacuum. The inner press may include openings that apply vacuum in selected areas of the inner press to vacuum form the ply within the selected areas. To control the ply on the upper press assembly, vacuum that is applied though passageways in the upper press ring to the gap between the upper press ring and the inner press is controlled through a seal in the gap. The upper press ring includes pivotal joints that increase adjustability of the forming surface of the upper press ring to the face surface of the inner press.

12 Claims, 10 Drawing Sheets

MULTI-STAGE GLASS PRESSING SYSTEMS AND METHODS

BACKGROUND

Vehicle glass panels, such as windshields and windscreens, are usually laminated structures that include two layers of glass that are bound together by a thermoplastic material, such as vinyl. Flat sheets of glass (e.g., float glass) that are larger than the desired size of the laminated structure are cut to size to create inner and outer glass plies. The edges of the glass plies are ground, the plies are washed, and a ceramic paint is often applied to a portion or portions of one or both of the plies. The plies are heated and shaped, either one ply at a time (i.e., a singlet process) or at the same time with both plies stacked (i.e., a doublet process). The shaping process is accomplished by pressing the plies into their final form using a press tool. Generally, a lower press ring lifts the plies and presses them on to a top press to achieve the desired shape and dimensional characteristics. A thermoplastic material layer or layers are inserted between the plies and the laminated structure is heated in an autoclave such that the desired clarity and visual characteristics of the laminated structure are achieved.

Vehicle manufacturers often design vehicle glass panels that utilize glass having curves of smaller radii to improve wiperability, reduce weight, improve the vehicle's aerodynamic properties, lower the vehicle's profile, etc. In forming such curves, the forming process must be designed such that the glass is not overstressed to the point that the glass breaks or buckles, thus creating optical and reflective distortion (i.e., a lens effect). However, current manufacturing techniques often result in such deleterious effects. When a lower ring pushes the glass from the outside perimeter over the press shape, stresses are created in the glass that cause localized buckling around the perimeter of the glass. In the prior art, glass manufacturers attempted to minimize the effect of such bucking by including an additional step in the manufacturing process. Generally, the glass was pressed into shape according to the conventional process of forming the center of the glass first and then forming the perimeter areas of the glass. This process resulted in wrinkles and buckles in the glass and caused optical distortions. Counter forces were then applied to the formed glass to alleviate the wrinkles, buckles and other distortions resulting from this process. However, such buckling is a function of several variables including glass thickness, depth of the required bend in the glass, and the time that the glass is allowed to bend during the forming process. Such complexities made the use of counter forces to alleviate folds, wrinkles, buckles and the like difficult and produced somewhat unpredictable results. Accordingly, such prior art systems and methods have resulted in slower manufacturing processes and higher breakage rates making the overall process more costly. Moreover, such processes still failed to produce transparencies of acceptable quality for some applications.

For example, newer model vehicles offer optional features that demand a higher degree of fidelity to the precise surface contours and dimensions of the windshield that is used. For example, some vehicles offer a feature for automatic activation of the breaking system in response to road obstructions. In another example, some current model vehicles offer a feature by which the firmness of the vehicle suspension system is regulated to anticipate and counteract irregularities in the road surface. Such systems are controlled by comparison of road images that are taken simultaneously from different, forward looking vantage points from inside the vehicle. The image comparison is provided to the breaking control system or the suspension control system. The brakes and the suspension are adjusted according to the size and location of the sensed obstruction or irregularity. The forward looking images are captured by cameras that view the roadway through the windshield. Both systems require the cameras to provide images of relatively high resolution within a relatively short response time. Distortions in the windshield of a degree that may be acceptable for vehicles without such breaking and suspension features cannot be tolerated within those portions of the windshield that are in the field of view of the camera. Such distortions may cause the braking system or the suspension control system to misinterpret road conditions and cause the system to fail to react or to react improperly. Accordingly, there was a need in the prior art for systems and methods for improving the surface quality and dimensional control of windshields—especially those windshields on vehicles equipped with high-performance braking and suspension options such as those described herein.

Thus, there was a need for glass panel manufacturing processes and equipment that allows for glass panels to be formed while minimizing the negative effects of bending the glass and for improving the surface quality and dimensional control of transparencies.

SUMMARY

Various embodiments of the present invention are directed to an apparatus for shaping at least one glass sheet. The apparatus includes a lower press ring and an upper press ring configured to clamp a perimeter section of the glass sheet between the lower press ring and the upper press ring. The apparatus also includes an upper press at least partially disposed within the upper press ring, the upper press configured to shape at least a section of the glass sheet inside the perimeter section of the glass sheet.

Various embodiments of the present invention are directed to a system for shaping at least one glass sheet. The system includes a lower press ring and an upper press assembly. The upper press assembly includes an upper press ring configured to clamp a perimeter section of the glass sheet between the lower press ring and the upper press ring, and an upper press at least partially disposed within the upper press ring, the upper press configured to shape at least a section of the glass sheet inside the perimeter section of the glass sheet. The system further includes a press positioning assembly that is configured to raise and lower the upper press within the upper press ring.

Various embodiments of the present invention are directed to an apparatus for shaping at least one glass sheet. The apparatus includes means for clamping a perimeter section of the glass sheet, and means for shaping at least a section of the glass sheet inside the perimeter section of the glass sheet.

Various embodiments of the present invention are directed to a method for shaping at least one glass sheet. The method includes clamping a perimeter section of the glass sheet between a lower press ring and an upper press ring, and shaping at least a section of the glass sheet inside the perimeter section of the glass sheet using a movable upper press that is disposed within the upper press ring.

In accordance with the invention disclosed herein, a multistage press is used to shape transparency plies by clamping the band of the transparency near the perimeter of the transparency and pressing the center of the area of the transparency inside the band to the final desired shape while the perimeter band of the transparency remains clamped. The system includes an upper press assembly that includes an upper ring and an inner press. The upper ring defines a forming surface that is located between the perimeter edge of the upper ring and a center opening through the upper ring. A lower press ring has a clamping surface that is oriented to face the forming surface of the upper ring. The lower press ring and the upper ring are moveable with respect to each other so that they can be brought together to clamp the perimeter band of the transparency between the forming surface of the upper ring and the clamping surface of the lower ring. An inner press that is located in the center opening of the upper ring has a face surface with a profile that corresponds to the final shape of the center portion of the transparency. The inner press is moveable within the center opening of the upper ring between a first position where the face surface does not contact the transparency after the transparency is clamped between the upper ring and the lower press ring and a second position where the perimeter of the face surface of the inner press is substantially even with the edge of the center opening of the upper ring. When the inner press is in the second position, the face surface of the inner press forms and defines the surface of the transparency. Mechanical apparatus controls the movement of said inner press between said first and second positions with respect to said upper ring. However, while the transparency is still being shaped, a vacuum is applied from a vacuum source through openings in the face surface of the inner press to locations between the upper press assembly and the transparency. The vacuum is strong enough to form at least a portion of the transparency. After the transparency is formed, the upper ring and the lower press ring are moved apart to relieve the clamping of the transparency. After the upper ring and the lower press ring are moved apart, the vacuum apparatus maintains the transparency on the upper press assembly. As the vacuum apparatus continues to maintain the transparency on the upper press assembly, a cold ring is laterally advanced below the transparency. When the cold ring is laterally positioned to receive the transparency, the vacuum is discontinued and the transparency falls away from the upper press assembly and is received by the cold ring. Thereafter, the transparency can be maintained on the cold ring until the transparency has sufficiently hardened to be handled by other equipment.

Preferably, the upper ring includes two or more pivotal joints between different portions of the upper ring. The pivotal joints allow adjacent portions of the upper ring to pivot with respect to each other. However, the pivotal joints block the shear movement between adjacent portions of the upper ring. In this way, the upper ring allows for torsional movement or flexing so that the forming surface of the upper ring laterally aligns with the peripheral edge of the face surface of the inner press at times when the inner press is in the forming position while avoiding discontinuities or offsets between the forming surface of adjacent portions of the upper ring.

Also preferably, the flow path between the vacuum source and the openings in the face surface of the inner press includes a chamber wherein the vacuum is regulated such that the vacuum at the openings in the face surface of the inner press is greater than the vacuum needed to maintain the ply on the upper press assembly. The vacuum is sufficiently strong to contribute to the formation of the ply surface in the area of the openings. The greater vacuum results in greater fidelity of the surface of the ply to the face surface of the inner press in the area or areas of the openings as compared to the surface of the ply to portions of the face surface of the inner press that are outside the area of the openings.

More preferably, the flow path between the vacuum source and the openings in the face surface of the inner press include an array of passageways between the regulated vacuum chamber and respective openings in the face surface of the inner press. The pattern of the array of passageways and the respective openings define an envelope within which the greater fidelity of the surface of the ply occurs. The envelope can have any predetermined shape depending on the pattern and location of the openings.

In some embodiments, improved vacuum response is achieved by applying the vacuum that holds the formed ply to the upper press assembly from a passageway through the upper press ring to the gap between the upper press ring and the inner press. At times when the inner press is in the forming position, a seal blocks air flow from the between the upper surfaces of the upper press ring and the inner press to the passageway through the upper press ring. This results in an air pressure differential between the side of the ply that is in contact with the upper press assembly and the opposite side of the ply so as to maintain the ply against the upper press assembly. At times when the inner press is moved away from the forming position toward the retracted position, the seal in the gap between the inner press and the upper press ring is broken and air is allowed to flow through the gap from between the upper surface of the inner press and the upper surface of the upper press ring. Such air flow equalizes the air pressure on opposite sides of the ply such that the ply falls away from the face of the upper press assembly. Controlling the application of vacuum to one side of the ply through application of a seal that is physically close to the ply affords a fast application and release of vacuum to the ply. In this way, response in securing the ply to and releasing the ply from the upper press assembly is faster than presses known in the prior art.

Also, in some embodiments, the upper press ring includes a plurality of heating elements, each of such heating elements having a major longitudinal axis that is oriented in a position that is generally parallel to the direction of movement of the inner press between the retracted and forming positions. In this way, the heating elements have respective longitudinal ends that are equidistant from the forming surface of the upper press ring. Furthermore, the heating elements are evenly distributed with respect to the forming surface of the upper press ring. This orientation and location of the heating elements afford a more even heating of the forming surface of the upper press ring in comparison to presses known in the prior art.

Those and other details, objects, and advantages of the present invention will become better understood or apparent from the following description and drawings showing embodiments thereof.

BRIEF DESCRIPTION OF THE DRAWINGS

Various embodiments of the present invention are described herein by way of example in conjunction with the following figures, wherein.

DESCRIPTION

Embodiments of the present invention are directed to a multi-stage glass panel manufacturing process in which the perimeter of at least one glass sheet that comprises the glass panel is clamped to a final dimensional profile. The center of the glass sheet is then pressed out to achieve the desired dimension and shape of the glass. Such a process minimizes compressive stress, reduces thin film buckling, and reduces optical distortion. In various embodiments, the present invention may be used to shape single glass sheets (i.e., singlets), double glass sheets (i.e., doublets), or any other multiple of glass sheets.

As used herein, spatial or directional terms, such as "inner," "outer," "left," "right," "up," "down," "horizontal," "vertical," "upper," "lower," and the like, relate to the invention as it is shown in the figures. However, it is to be understood that embodiments of the present invention can assume various alternative orientations and, accordingly, such terms are not to be considered as limiting. Further, all numbers expressing dimensions, physical characteristics, and so forth, used in the specification and claims are to be understood as being modified in all instances by the term "about." Accordingly, unless indicated to the contrary, the numerical values set forth in the following specification and claims can vary depending upon the desired properties sought to be obtained by embodiments of the present invention. Moreover, all ranges disclosed herein are to be understood to encompass any and all subranges subsumed therein. Also, as used herein, terms such as "positioned on," "into contact with" or "supported on" mean positioned or supported on but not necessarily in direct surface contact with.

Figure 1:
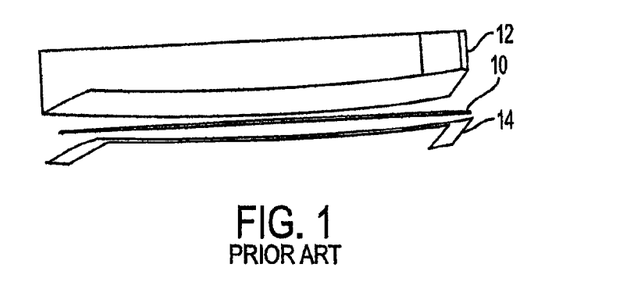
FIGS. 1 and 2 illustrate successive steps in a prior art glass panel fabrication process.
Figure 2:
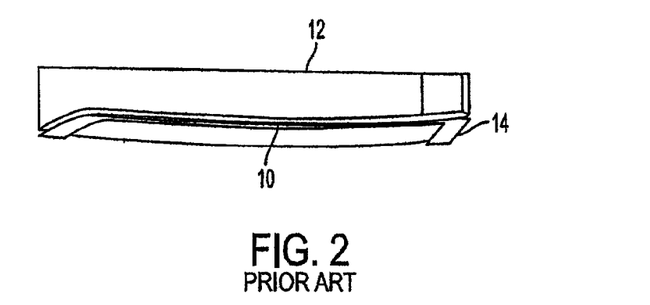

In a glass fabrication process, glass sheets are heated, formed into a desired shape, and annealed in, for example, a lehr. FIGS. 1 and 2 illustrate successive steps in a prior art glass panel fabrication process and, in particular, a prior art glass shaping process. In FIG. 1, a glass sheet 10, which is to be formed into a desired shape for, for example, a vehicle windshield, is positioned between an upper press 12 and a lower press, or press ring, 14. As illustrated in FIG. 2, either the upper press 12, the lower press ring 14, or both the upper press 12 and the lower press ring 14 are moved so that the glass sheet 10 is formed to its desired shape due to the forces exerted on the glass sheet 10 by the upper press 12 and the lower press ring 14. The lower press ring 14 may be either a ring that contacts the perimeter of the glass sheet 10 or a mold that contacts all or a substantial portion of the glass sheet 10.

Figure 3:
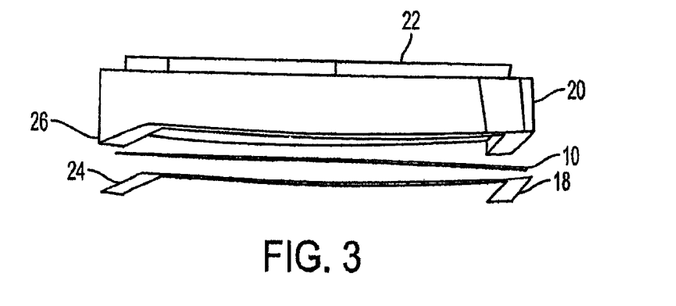
FIGS. 3-5 illustrate successive steps in a glass panel fabrication process in accordance with various embodiments of the present invention.
Figure 4:
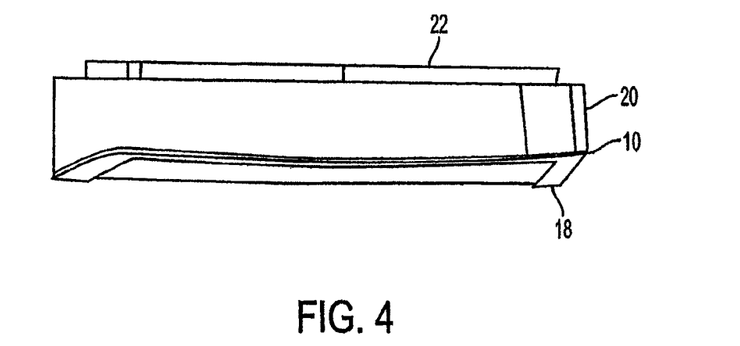
Figure 5:
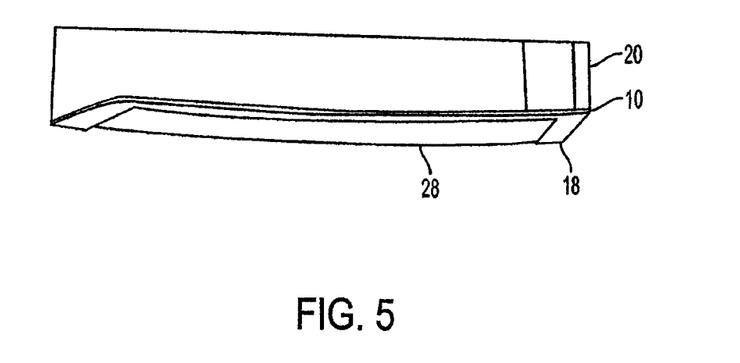

FIGS. 3-5 illustrate successive steps in a glass panel fabrication process in accordance with various embodiments of the present invention. As shown in FIGS. 3-5, a glass panel, such as a vehicle windshield, is formed into a desired shape using a multi-stage pressing process. As illustrated in FIG. 3, the glass sheet 10 is positioned between a lower press ring 18 and an upper press ring 20. An upper press 22, positioned within the upper press ring 20, is in a retracted position in which its lower surface 28 is located above the bottom face of the upper press ring 20. As illustrated in FIG. 4, in various embodiments either the upper press ring 20, the lower press ring 18, or both the upper press ring 20 and the lower press ring 18 are moved toward each other so that the glass sheet 10 is brought into contact with an upper surface 24 of the lower press ring 18 and a lower surface 26 of the upper press ring 20. The glass sheet 10 is thus clamped in place by the lower press ring 18 and the upper press ring 20. The perimeter of the glass sheet 10 is formed into the desired shape as defined by the shape of the lower press ring 18 and the upper press ring 20 when the press rings 18, 20 clamp the perimeter of the glass sheet 10. However, the area inside of the perimeter of the glass sheet 10, including the portion in the middle of the glass sheet 10, is not formed into its desired shape by such clamping.

As illustrated in FIG. 5, after the glass sheet 10 is clamped into place by the press rings 18, 20, the upper press 22 is actuated in a downward direction within the upper press ring 20 such that an area inside of the perimeter of the glass sheet 10 (e.g., a middle area) is formed in the shape of the lower surface 28 (as seen through the glass sheet 10 in FIG. 5) of the upper press 22. It can be understood that the upper press 22 may be disposed in the upper press ring in any suitable manner and in one embodiment may be coaxially located within the upper press ring 20. The press rings 18, 20 and the upper press 22 may be constructed of, for example, billet steel, cast iron, ceramic, or any combination of the aforementioned materials. It can be understood that protective cloths (not shown) may be employed to protect the surface of the glass sheet 10 from the various surfaces of the press rings 18, 20 and the upper press 22. Such cloths may be constructed of, for example, stainless steel or a stainless steel/fiber cloth composite.

The process illustrated in FIGS. 3-5 has the advantage that it produces lower perimeter strain on the glass sheet 10 and thus perimeter distortion is reduced. Also, the process results in a lower and more evenly distributed strain on the glass sheet 10 during forming.

Figure 6:
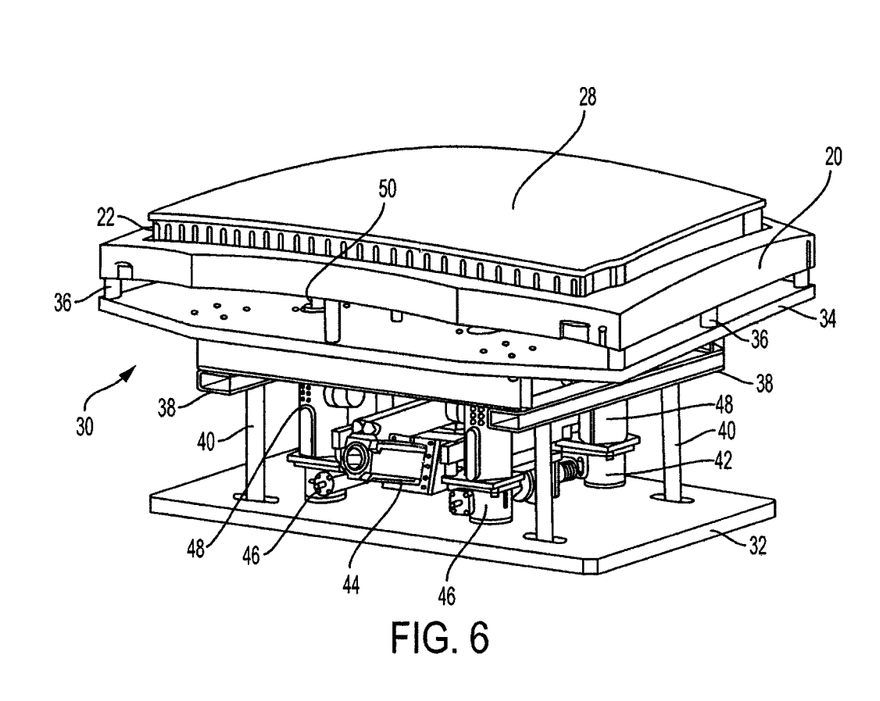
FIG. 6 illustrates a perspective view of a glass press assembly that incorporates various elements of FIGS. 3-5 according to various embodiments of the present invention.

FIG. 6 illustrates a perspective view of a glass press assembly 30 that incorporates various elements of FIGS. 3-5 according to various embodiments of the present invention. As illustrated in FIG. 6, the assembly 30 is fixed in place with a mounting plate 32. The mounting plate 32 rigidly affixes the assembly 30 to, for example, a structural element of a tool on which the assembly 30 is mounted or a structural or mounting element of a building in which the assembly is housed. A lower plate 34 is attached to the upper press ring 20 via supports 36. The lower plate 34 is in turn attached, via a frame 38 and supports 40, to the mounting plate 32. An upper press positioning assembly 42 operates to raise and lower the upper press 22 within the upper press ring 20. The assembly 42 includes a reversible power source 44, such as a motor, that actuates piston assemblies 46. In various embodiments, the power source 44 may include an electric servo motor that incorporates a ball screw drive mechanism, an air cylinder, or any other type of hydraulically driven, cam driven, or air driven power source. Piston housings 48 of the piston assemblies 46 are each attached at one end to the mounting plate 32 and at the other end to the lower plate 34. Piston rods 50 that extend downward from the housings 48 of each of the piston assemblies 46 are attached to a top surface 52 of the upper press 22. Actuation of the piston assemblies 46 thus causes the upper press 22 to raise and lower within the confines of the upper press ring 20.

Figure 7:
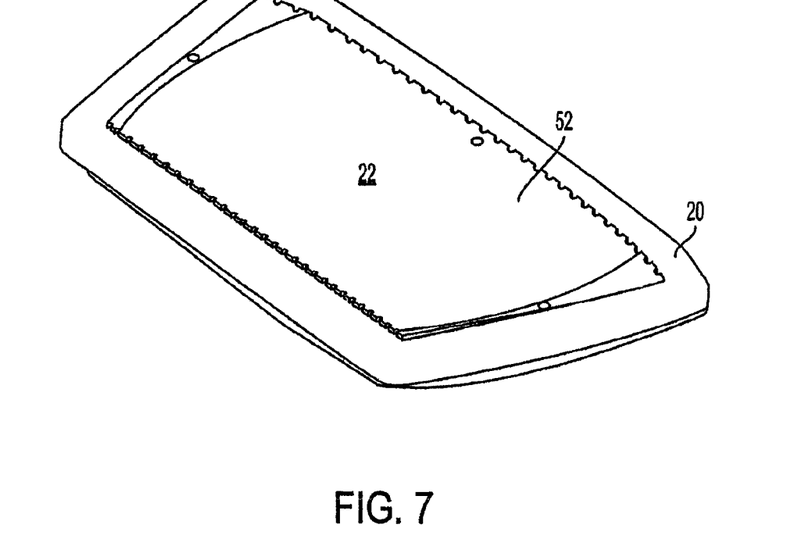
FIG. 7 illustrates a top perspective view of the upper press ring and the upper press according to various embodiments of the present invention.
Figure 8:
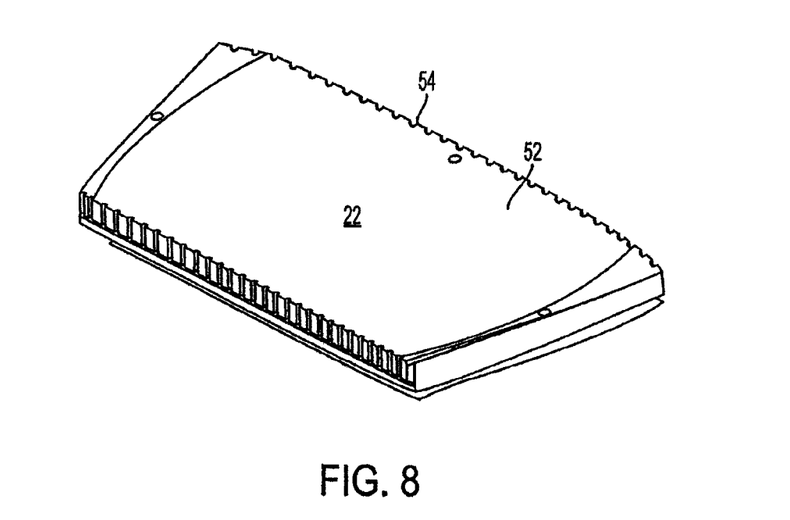
FIG. 8 illustrates a top perspective view of the upper press according to various embodiments of the present invention.

FIG. 7 illustrates a top perspective view of the upper press ring 20 and the upper press 22 according to various embodiments of the present invention. FIG. 8 illustrates a top perspective view of the upper press 22, as removed from the upper press ring 20, according to various embodiments of the present invention. As illustrated in FIG. 8, the upper press 22 may include a plurality of notches 54 that align with a plurality of protrusions (not shown) located on an inside surface of the upper press ring 20 so that the upper press ring remains in alignment during operation.

Embodiments of the present invention are directed to a process of forming glass sheets into a desired shape. The process may be used on glass sheets that are heated to a relatively low temperature without compromising the effectiveness of the process. Embodiments of the process and apparatus disclosed herein allow for a reduction in distortion of the formed glass and allow relatively complex shapes to be formed out of glass sheets. It can be understood that the process and apparatus disclosed herein may be used with or without the aid of a vacuum device used in the glass forming process. It can be understood that, although embodiments of the present invention are described herein as including two steps in the glass forming process (i.e., perimeter forming and center forming), any number of steps may be used as part of a multi-stage process to form a glass sheet into a desired shape. For example, after the perimeter of the glass sheet is clamped (i.e., formed), multiple upper presses may be used to form various portions of the glass sheet into a desired shape.

Figure 9:
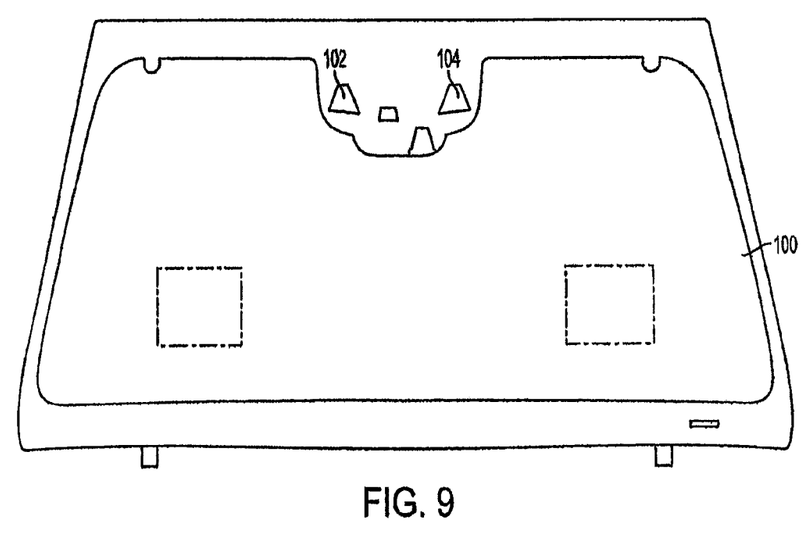
FIG. 9 is an illustration of a windshield having camera viewing areas for use in a vehicle with optical controls of a type suitable for braking and suspension systems.

FIG. 9 illustrates a windshield of the type that is used in vehicles having optically augmented braking or suspension systems such as previously discussed herein. In FIG. 9, a windshield 100 illustrates two viewing areas 102 and 104 through which respective cameras (not shown) capture images of the advancing roadway as the vehicle is moving. The cameras provide optical inputs to the augmented systems. The augmented breaking, suspension or other control system reacts according to a predictive algorithm that requires optical inputs with relatively high resolution, sensitivity and response time in comparison to optical systems previously known in the automotive industry. One consequence of such higher performance demands is that the images available to the cameras through the windshield must be free of optical distortions that previously were acceptable. Accordingly, the camera optical sensors view images through viewing areas 102 and 104 that afford improved fidelity of images viewed therethrough.

Improvements in the image quality seen through viewing areas 102 and 104 is generally realized through improved dimensional control of the windshield within areas 102 and 104. In accordance with the presently disclosed invention, this is accomplished through one or more improvements in the manufacturing processes and apparatus that are used to make windshield 100.

Figure 10:
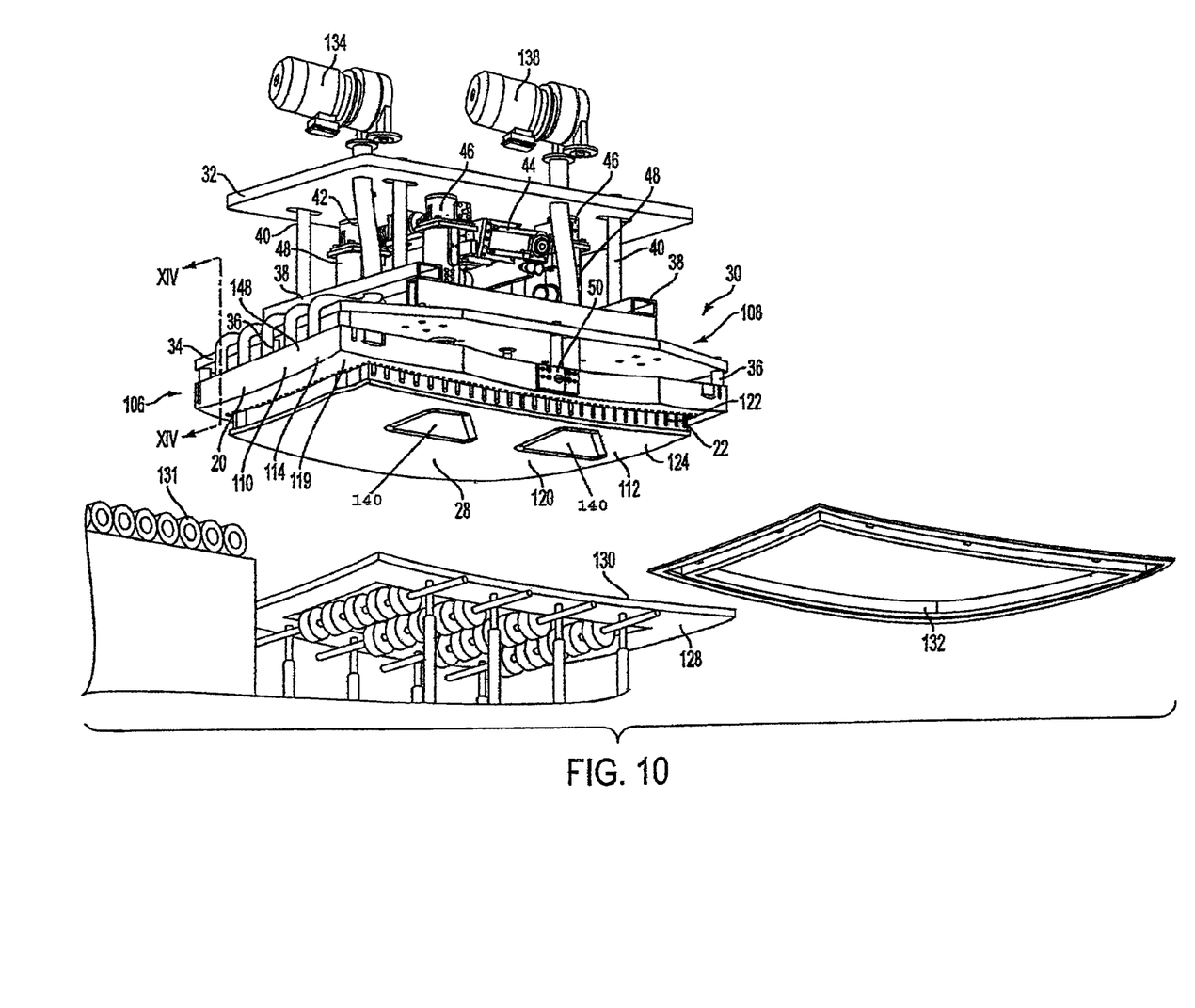
FIG. 10 is a perspective view of a press assembly that incorporates various elements of FIGS. 10A-16 in accordance with the presently disclosed invention.
Figure 12:
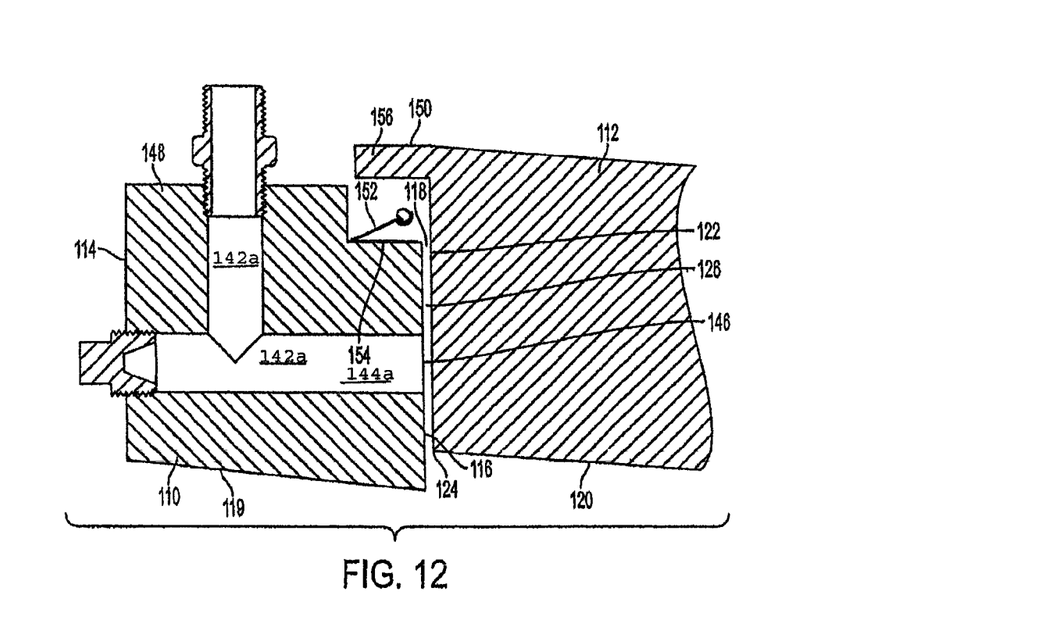
FIG. 12 is a cross-section of the upper press ring and the inner press of FIG. 10 wherein the vacuum in the gap between the upper press ring and the inner press is supplied through an opening in a wall of the upper press ring that cooperates with a seal in the gap.

FIG. 10 illustrates an embodiment of the disclosed multistage press wherein a vacuum forming process is used, at least in part, to form the portions of windshield 100 that are included in viewing areas 102 and 104. FIG. 10 is a perspective view of a multistage press 106 that includes an upper press assembly 108. Upper press assembly 108 includes an upper press ring 110 and an inner press 112. FIGS. 6 and 12 show an upper press ring 110 that defines an outer peripheral edge 114 and an oppositely disposed wall 116 that defines a central opening 118 in upper press ring 110. Upper press ring 110 further defines a forming surface 119 between the outer peripheral edge 114 and wall 116.

FIGS. 6 and 12 further show that inner press 112 defines a face surface 120 and an outer peripheral side 122 that terminates in a peripheral edge 124 at the intersection of peripheral side 122 and face surface 120. Inner press 112 is located in central opening 118 of upper press ring 110 so as to define a gap 126 between the peripheral side 122 of inner press 112 and wall 116 that defines the central opening of upper press ring 110.

Inner press 112 is moveable within the central opening 118 of upper press ring 110 between a retracted position and a forming position. In the retracted position, inner press is withdrawn from the forming surface 119 of upper press ring 110 such that peripheral edge 124 of inner press 112 is inside or recessed into the central opening 118 of upper press ring 110. When inner press 112 is located at the forming position, peripheral edge 124 of inner press 112 is located away from the retracted position and closer to the forming surface 119 of upper press ring 110. When inner press 112 is in the forming position, peripheral edge 124 is essentially laterally even with forming surface 119.

Multistage press 106 further includes a lower press ring 128. Lower press ring 128 has a clamping surface 130 that is oriented with respect to forming surface 119 of upper press ring 110 such that it opposes or oppositely faces forming surface 119. At least one of lower press ring 128 and upper press ring 110 are moveable with respect to each other such that forming surface 119 and clamping surface 130 can be moved toward each other to clamp the ply between forming surface 119 and clamping surface 130. Lower press ring 128 and upper press ring 110 are also moveable in the opposite direction away from each other such that when upper press ring 110 and lower press ring 128 are moved apart, a ply that is clamped between forming surface 119 and clamping surface 130 will be released from between those surfaces.

Similar to the embodiment of FIGS. 3-6, the embodiment of the multistage press illustrated in FIG. 10 forms a ply when feeder rolls 131 or other mechanisms move the ply to a location between upper press assembly 108 and lower press ring 128 at times when the lower press ring 128 and the upper press assembly are vertically apart and inner press 112 is in the retracted position with respect to upper press ring 110. While inner press 112 remains in the retracted position, upper press ring 110 and lower press ring 128 are then closed together such that an outer perimeter band of the ply is clamped between forming surface 119 of upper press ring 110 and clamping surface 130 of lower press ring 128. Surfaces 119 and 130 are spaced apart such that the outer perimeter band of the ply that is clamped therebetween is formed according to the profiles of surfaces 119 and 130. Face surface 120 of inner press 112 does not touch the ply at this time because inner press 112 is still in the retracted position.

After the outer perimeter band of the ply is clamped between surfaces 119 and 130 and pressed into form according to the profiles of surfaces 119 and 130, inner press 112 is moved from its retracted position to its forming position as previously described herein. As inner press 112 is moved from the retracted position to its forming position, the face 120 of inner press 112 contacts the ply and presses the center portion of the ply into a shape according to the profile of face 120. In accordance with the presently disclosed invention, it has been found that, because the outer perimeter band of the ply is clamped, the ply is pressed into the profile that is defined by surfaces 119 and 130 and face 120 with less distortion and fewer optical imperfections than plies that are formed by first pressing the center of the ply and then forming the final shape of the ply by pressing the outer perimeter margins of the ply.

To form plies at a faster rate, the presently disclosed embodiment further includes a mechanism for transferring the formed ply away from the press without excessive delay time for the ply to cool. In the embodiment, a cold ring 132 is used to receive the ply from the upper press assembly 108. More specifically, a vacuum source 134 is in fluid communication with the gap 126 between wall 116 and peripheral side 122. After the ply has been formed as described above, the vacuum source 134 applies a partial vacuum within gap 126 as is hereinafter more fully explained in connection with FIGS. 12 and 13. The partial vacuum is first established when surfaces 119 and 130 have been closed to form the outer perimeter band of the ply and inner press 112 has been moved to its forming position to form the center of the ply. With the partial vacuum applied at this stage, lower press ring 128 and upper press assembly 108 are moved vertically apart while inner press 112 remains in the forming position.

Due to the partial vacuum in gap 126, as lower press ring 128 moves away from upper press assembly 108, atmospheric pressure against the side of the ply opposite from upper press assembly 108 maintains the ply against upper press assembly 108. While the ply is thus maintained against upper press assembly 108, a cold ring 132 is positioned to receive the formed ply.

Cold ring 132 is laterally moveable between upper press assembly 108 and lower press ring 128 at times when the upper press assembly and the lower press ring are moved apart from each other. When cold ring 132 is positioned vertically below upper press assembly 108, the vacuum between vacuum source 134 and gap 126 is interrupted. The change in air pressure around the ply allows the ply to fall away from upper press assembly 108 to be received by cold ring 132. Cold ring 132 then carries the formed ply laterally away from between upper press assembly 108 and lower press ring 128 and the next ply to be formed is positioned between upper press assembly 108 and lower press ring 128.

Figure 10A:
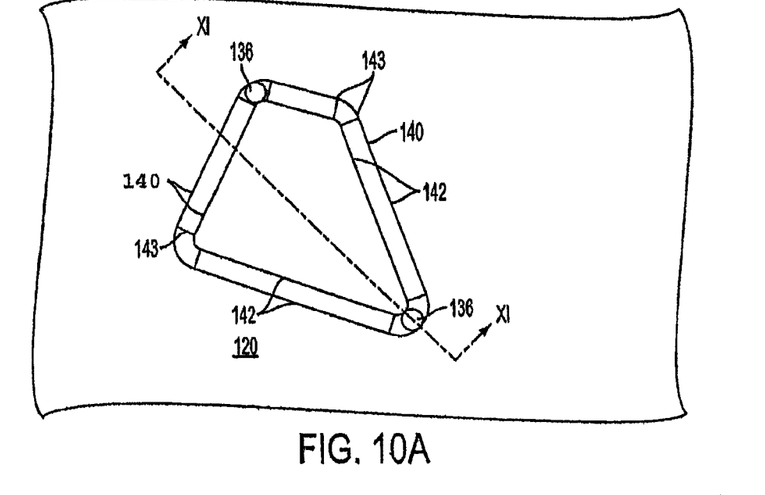
FIG. 10A shows a portion of the face surface of an inner press that is included in a system for vacuum forming camera viewing areas such as illustrated in FIG. 9.
Figure 11:
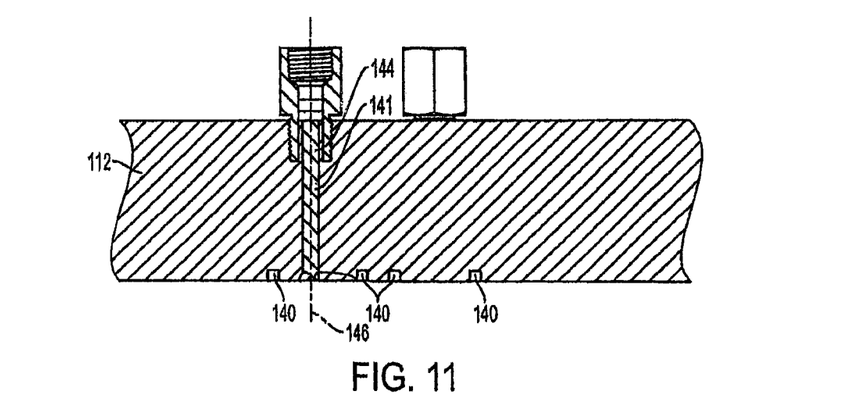
FIG. 11 is an elevation of the inner press shown in FIG. 10A taken along the lines XI-XI of FIG. 10A.

As more particularly disclosed in connection with FIGS. 10A and 11, the presently disclosed embodiment utilizes vacuum forming to further improve optical quality and dimensional fidelity in selected areas of the ply such as illustrated by camera viewing areas 102 and 104 of FIG. 9. FIG. 10A is a bottom plan view of a portion of face surface 120 of inner press 112 that applies vacuum forming to selected areas of the face surface. As shown in FIG. 10A, face surface 120 includes at least one opening 136. In the particular embodiment of FIG. 10A, two openings 136 are shown although any number of such openings are within the contemplation of the present disclosure. A vacuum source is in communication with the openings 136. In the presently disclosed embodiment, the vacuum source is a vacuum pump 138 that is independent of the vacuum source that is used to maintain the formed ply on the upper press assembly 108. However, it will be apparent to those skilled in the art that vacuum pump 138 could be combined with vacuum source 134 as a single vacuum source and that many other available configurations of a vacuum supply are also within the scope of the subject disclosure.

Openings 136 are associated with the vacuum pump 138 to selectively apply additional pressure to the ply with the area of openings 136 so as to form the ply in that area by vacuum forming. As particularly shown in FIGS. 10A and 11, openings 136 include a slot 140 in face surface 120 of inner press 112. Preferably, slot 140 is in the form of a closed loop that defines the perimeter of the area that is vacuum formed. Slot 140 is in fluid communication with vacuum pump 138 by a passageway 141 through inner press 112. Preferably, slot 140 may include a family of parallel slots 142 that may be two or more slots. In addition, slot 140 may further include a plurality of cross-channels 143 that extend between two or more parallel slots 142.

As particularly shown in FIG. 11, in some embodiments, passageways 141 may form borings 144 through inner press 112. Each of borings 144 has a longitudinal axis 146 that is parallel to the direction of travel of inner press 112 as it moves between the retracted position and the forming position. In some embodiments, the openings 136 correspond to a plurality of respective passageways 141 such that the openings form a pattern that corresponds to the portion of the face surface 120 wherein the ply is at least partially formed by vacuum or, in some cases, is formed by vacuum in combination with mechanical pressure of the multistage press.

In accordance with the disclosed embodiment, vacuum pump 138 may include controls for regulating the vacuum pressure in the opening that includes openings 136, parallel slots 142, and cross-channels 143. The vacuum in openings 136, slots 142, and cross-channels 143 or other opening 136 is sufficient to contribute to forming the ply in the portion of the face surface 120 that is enclosed by slots 142.

Figure 13:
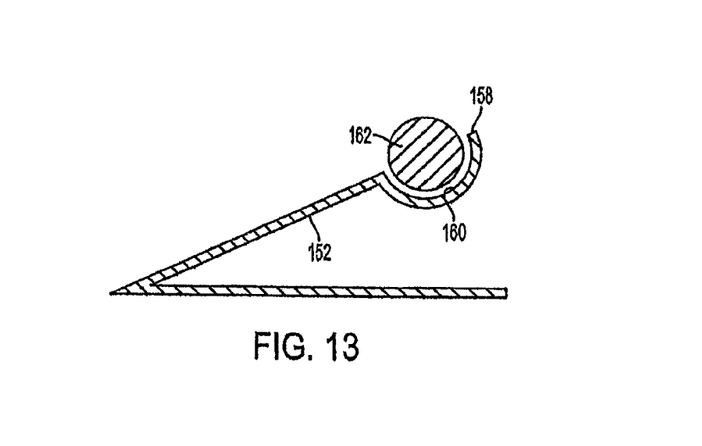
FIG. 13 is an enlarged view of the seal shown in FIG. 12.

FIGS. 12 and 13 disclose further details of an embodiment wherein the fluid communication between the vacuum source 134 and gap 126 includes at least one passageway 142a through upper press ring 110. Each of passageways 142a has one end 144a that terminates in a respective opening in wall 116 of central opening 118. Preferably, the fluid communication between vacuum source 134 and gap 126 includes a plurality of passageways 142a that are spaced apart from each other around the perimeter of upper press ring 110.

In some embodiments, the upper press ring 110 and the inner press 112 cooperate with further structure to control the application of vacuum to gap 126. FIG. 12 shows that upper press ring 110 defines a top surface 148 that is oppositely disposed on the upper press ring from forming surface 119. Inner press 112 defines a top surface 150 that is oppositely disposed on inner press 112 from face surface 120. In this embodiment, multistage press 106 includes a seal 152 that is located between upper press ring 110 and inner press 112. Seal 152 is positioned between the peripheral side 122 of upper press ring 110 and wall 116 of inner press 112 so as to block the flow of air from between top surface 148 and top surface 150 and through gap 126 to opening 146 in wall 116 at times when inner press 112 is in the forming position. In addition, seal 152 allows the flow of air from between top surfaces 148 and 150 through gap 126 to opening 146 at times when inner press 112 is in the retracted position. This structure allows the multistage press to apply a vacuum from the opening 146 in wall 116 at times when inner press 112 is in the forming position so that atmospheric pressure against the exposed surface of a ply (i.e. the surface oppositely disposed on the ply from the surface of the ply that faces upper press assembly 108) will retain the formed ply on the upper press assembly. To break the partial vacuum and release the formed ply from the upper press assembly, the inner press 112 is moved in the direction of the retracted position to a point at which the seal 152 allows airflow from between top surfaces 148 and 150 through gap 126 to opening 146. The pathway for air flow breaks the partial vacuum between the ply and the upper press assembly to allow the ply to fall away from the upper press assembly.

In the embodiment of FIGS. 12 and 13, the wall 116 of central opening 118 defines a seat 154 to support seal 152. Peripheral side 122 of inner press 112 defines a flange 156. Flange 156 extends radially outward and over the radial position of seal 152 such that at times when inner press 112 is in the forming position seal 152 cooperates with flange 156 to block airflow through gap 126 past seal 152. Those skilled in the art will understand that a seat for seal 152 alternatively could be established in peripheral side 122 of inner press 112.

In some embodiments, seal 152 is a V-shaped seal of spring steel is shown in FIGS. 12 and 13. Also in some embodiments, the V-shaped seal has a distal end 158 that defines a trough 160. A rope packing 162 may be carried in trough 160 to improve the seal between the upper press ring 110 and the inner press 112.

Figure 14:
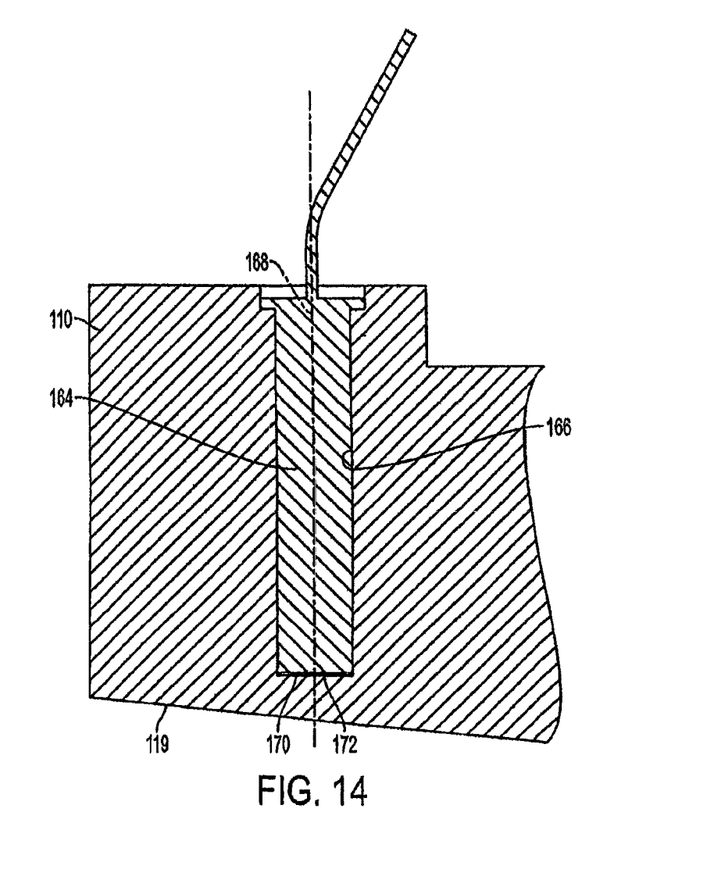
FIG. 14 is a partial elevation cross-section of the upper press ring shown in FIG. 10 taken along the lines XIV-XIV of FIG. 10 and showing the orientation of heaters used in the upper press ring.

In some embodiments, the multistage press 106 has heating elements 164 that are included in upper press ring 110 in an orientation that affords improved heating in comparison to heating element arrangements known in the prior art. As illustrated in FIG. 14, heating elements 164 are located in respective borings 166 that are advanced from the top surface 148 of upper press ring 110. Heating elements 164 are elongated along respective longitudinal axes 168 that are parallel to the direction of movement of inner press 112 between the retracted position and the forming position. The heating elements 164 define a longitudinal end 170 that has a centerpoint 172. Such orientation is preferred over heating elements known in the prior art because, among other reasons, it allows more uniform placement of the heating elements with respect to the forming surface 119 of upper press ring 110. More specifically, the respective centerpoints 172 of the respective longitudinal ends 170 of heating elements 164 are equidistant from forming surface 119 of upper press ring 110. Such location of heating elements 164 affords more uniform heating of the forming surface 119.

Also, preferably, borings 166 and the respective heating elements 164 are evenly spaced around upper press ring 110. Such uniform placement further affords more uniform heating of the forming surface 119 in comparison to prior art arrangements.

Figure 15:
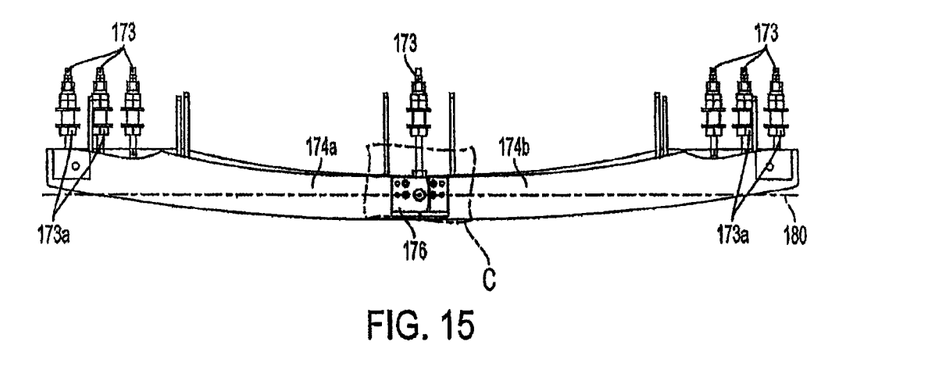
FIG. 15 is an assembly drawing of an upper press ring that includes a pivotal hinge.
Figure 16:
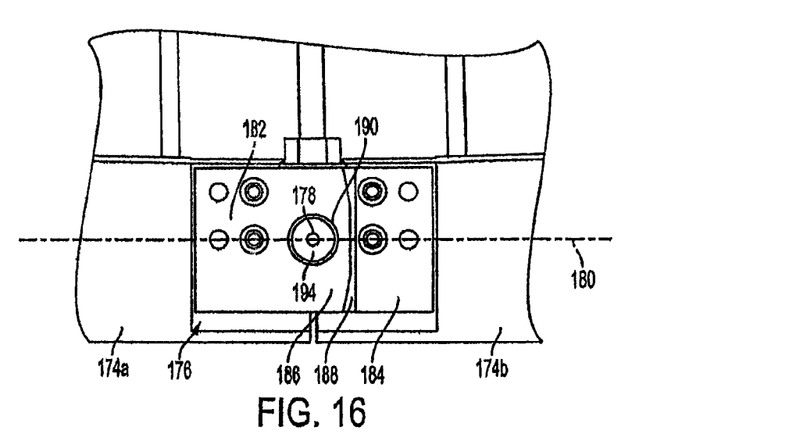
FIG. 16 is an enlargement of the portion of the upper press ring shown in FIG. 15 included in outline "C".
Figure 17:
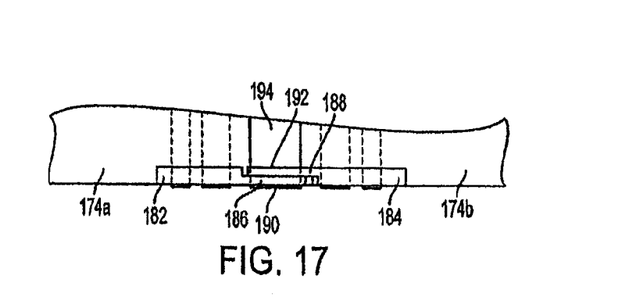
FIG. 17 is a plan view of the portion of the upper press ring shown in FIG. 16.

FIGS. 15, 16 and 17 illustrate an embodiment of the multistage press 106 in which the upper press ring 110 includes mechanical adjustments for positioning the upper press ring with respect to inner press 112. Upper press ring 110 includes a plurality of threaded adjustment pins 173. By rotating nuts 173a on the respective pins 173, upper press ring 110 can adjusted with respect to inner press 112 such that the forming surface 119 of upper press ring 110 can be adjusted in a vertical direction. This vertical adjustment can be used to cause forming surface 119 of upper press ring 110 to be even with face surface 120 of inner press 112.

However, it has been found that thermal stresses within upper press ring 110 may vary the contour of forming surface 119 to cause it to become misaligned with respect to face surface 120, notwithstanding the adjustment of upper press ring 110 that is available through adjustment pins 173. FIG. 16 is an enlargement of the protion of the upper press ring shown in FIG. 15 included in outline "C". In accordance with the embodiments of FIGS. 15 and 16, upper press ring 110 may further include at least two segments 174a, 174b that are connected by pivotal joints 176. In the disclosed embodiment, pivotal joints 176 are located on respective opposite sides of upper press ring 110. Pivotal joints 176 allow segments 174a, 174b to pivot with respect to each other. In this way, the range of motion of one segment 174a, 174b in a normal direction with respect to the face surface 120 of inner press 112 is increased. Furthermore, one segment 174a can be moved in a directional sense that is either the same as or opposite from the directional sense in which the other segment 174b may be moved—depending on the adjustment that best matches face surface 120 of inner press 112. In this way, the upper press ring may be more closely adjusted to match the forming surface 119 of upper press ring 110 to the face surface 120 of inner press 112.

Preferably, pivotal joints 176 are located at the midpoint 178 of the major axis 180 of upper press ring 110. Location of pivotal joints 176 at the midpoint 178 allows the center of upper press ring 110 to be moveable in a direction that is normal to face surface 120 of inner press 112. In this way, the center portion of upper press ring 110 is also adjustable with respect to the face surface 120.

In one embodiment, each of pivotal joints 176 are arranged to secure movement of the forming surface 119 of a first segment 174a with respect to the forming surface 119 of the adjacent segment 174b in a direction that is normal with respect to the face surface 120 of inner press 112 adjacent to the pivotal joint 176. As more specifically shown in FIGS. 16 and 17, each of pivotal joints 176 includes a first block 182 that is secured to segment 174a and a second block 184 that is secured to the adjoining segment 174b. Block 182 includes a flange 186 that extends in the direction of block 184 and block 184 includes a flange 188 that extends in the direction of block 182. Flanges 186 and 188 overlap each other and each of flanges 186 and 188 have respective holes 190 and 192. Flanges 186 and 188 receive cylindrical pin 194 in holes 190 and 192. Such structure allows flanges 186 and 188 to angularly pivot about pin 194 with respect to each other such that forming surface 119 of outer press ring 110 may be adjusted with respect to face surface 120 of inner press 112. Pin 194 allows pivotal motion of flanges 186 and 188 and blocks 182 and 184 while preventing motion of flanges 186 and 188 and segments 174a, 174b in a shear direction, meaning movement of flanges 186, 188 and segments 174a, 174b in a direction aligned with the movement of inner press 112 between the retracted position and the forming position.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

What is claimed is:

1. An apparatus for shaping at least one glass sheet, the apparatus comprising:
   a lower press ring that defines a clamping surface;
   an upper press ring that defines a forming surface and that also defines a wall around a center opening of said upper press ring, said upper press ring being movable with respect to said lower press ring to clamp a portion of the at least one glass sheet between the clamping surface of said lower press ring and the forming surface of said upper press ring;
   an upper press that is at least partially disposed within the center opening of said upper press ring and that is moveable within the center opening of said upper press ring between a retracted position and a forming position, said upper press defining an outer peripheral side that cooperates with the wall of said upper press ring to define a gap between the outer peripheral side of said upper press and the wall of said upper press ring, said upper press also defining a face surface that is configured to shape at least a portion of the at least one glass sheet at times when the at least one glass sheet is clamped between said lower press ring and said upper press ring, said face surface including at least one opening, said at least one opening being located on the same side of said gap as said upper press; and
   at least one vacuum source in fluid communication with said gap at times when said upper press is at said forming position and in fluid communication with said at least one opening in the face surface of said upper press, each of said at least one opening respectively defining;
      at least one passageway through said upper press; and
      a slot that forms a closed loop in the face surface of said upper press, said slot being in fluid communication with said at least one passageway such that each of said at least one opening contributes to forming the at least one glass sheet in response to vacuum conditions within said at least one passageway.

2. The apparatus of claim 1, wherein the upper press is radially disposed within the upper press ring.

3. The apparatus of claim 1, further comprising a power source that is configured to actuate movement of the upper press within the upper press ring.

4. The apparatus of claim 3, wherein the power source comprises an electric servo motor.

5. The apparatus of claim 1, further comprising a mounting plate configured to rigidly attach the upper press ring to a structural element.

6. A system for shaping at least one glass sheet, the system comprising:
   a lower press ring that defines a clamping surface;
   an upper press assembly, the upper press assembly comprising:
      an upper press ring that defines a forming surface and that also defines a wall around a center opening of said upper press ring, said upper press ring being movable with respect to said lower press ring to clamp a portion of the at least one glass sheet between the clamping surface of said lower press ring and the forming surface of said upper press ring; and
      an upper press that is at least partially disposed within the center opening of the upper press ring and that is moveable within the center opening of the upper press ring between a retracted position and a forming position, said upper press defining an outer peripheral side that cooperates with the wall of said upper press ring to define a gap between the outer peripheral side of said upper press and the wall of said upper press ring, said upper press also defining a face surface that is configured to shape at least a portion of the at least one glass sheet at times when said at least one glass sheet is clamped between said lower press ring and the upper press ring, said face surface also including at least one opening that is located on the same side of said gap as said upper press, each of said at least one opening respectively defining:
         at least one passageway through said upper press,
         two or more closed loop slots in said face surface, and
         at least one cross-channel in said face surface, with each of said at least one cross-channel extending between two or more of said two or more closed loop slots, and each of said at least one cross-channel also being in fluid communication with at least one of said at least one passageway, said upper press forming that part of said at least one glass sheet within said at least two or more closed loop slots in response to vacuum conditions that are applied to said at least one passageway;
      at least one vacuum source in fluid communication with said gap at times when said upper press is at said forming position and in fluid communication with said two or more closed loop slots in the face surface of said upper press to contribute to forming said at least one glass sheet; and
      a press positioning assembly that is configured to raise and lower the upper press within the upper press ring.

7. The system of claim 6, further comprising a mounting plate configured to secure the upper press assembly to a structural element.

8. The system of claim 6, wherein the press positioning assembly comprises a power source.

9. The system of claim 8, wherein the power source comprises an electric servo motor.

10. The system of claim 6, wherein the press positioning assembly comprises at least one piston assembly.

11. An apparatus for shaping at least one glass sheet, the apparatus comprising:
    means for clamping a perimeter section of the at least one glass sheet, said means for clamping including an upper press ring that defines a wall around a center opening of said upper press ring; and
    means for shaping at least a section of the at least one glass sheet at times when the perimeter section of the at least one glass sheet is clamped by said means for clamping, said means for shaping including an upper press that is disposed within the center opening of said upper press ring and that is moveable with respect to said upper press ring between a retracted position and a forming position, said upper press defining an outer peripheral side that cooperates with the wall of said upper press ring to define a gap between the outer peripheral side of said upper press and the wall of said upper press ring, said upper press also defining a face surface that is configured to shape at least a portion of the at least one glass sheet, said face surface having openings therein, said openings being located on the same side of said gap as said upper press, said openings including,
    passageways through said upper press, a family of two or more slots that form parallel closed loops in the face surface of said upper press, said family of two or more slots being in communication with at least one of said passageways, said upper press cooperating with at least one vacuum source in fluid communication with said gap at times when said upper press is at said forming position and in fluid communication with said passageways through said upper press to contribute to forming the glass sheet.

12. The apparatus of claim 11, further comprising means for actuating movement of the means for shaping.

* * * * *